April 17, 1928.

J. H. HUNT

HEAVY DUTY DISK WHEEL STRUCTURE

Filed March 4 1926

1,666,703

INVENTOR.
J. Harold Hunt,
BY
John P. Tarbox
ATTORNEY.

Patented Apr. 17, 1928.

1,666,703

UNITED STATES PATENT OFFICE.

J. HAROLD HUNT, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

HEAVY-DUTY DISK-WHEEL STRUCTURE.

Application filed March 4, 1926. Serial No. 92,149.

This invention relates to vehicle wheels and has particular reference to a disk wheel structure for use in connection with automobiles, and especially with motor trucks and busses and similar heavy duty vehicles.

The primary object of the present invention to provide a particularly simple and easily assembled wheel structure which shall be especially strong and durable against radial and lateral thrusts, and capable, to some extent, of taking the place of heavy duty multiple wheels.

Another object is to provide a wheel of this character wherein the machine work for the various interfitting elements shall be reduced to a minimum and such work easily and quickly accomplished with minimum handling.

With these and other objects in view, the invention may be stated to consist in the various novel features of arrangement or combination, all of which will be fully described hereinafter and pointed out in the appended claims.

In the drawing accompanying and forming a part of this application,

In constructing a wheel in accordance with my invention, I provide a hub member 1 with a radially projecting annular flange 2 which serves as a support for a pair of disks 3 and 4 and a brake drum 5 when the latter is included in the assembly as will be explained hereinafter.

Figure 3:
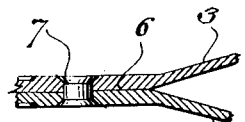
Fig. 3 is a fragmentary sectional view taken on the line 3—3 of Fig. 2.
Figure 1:
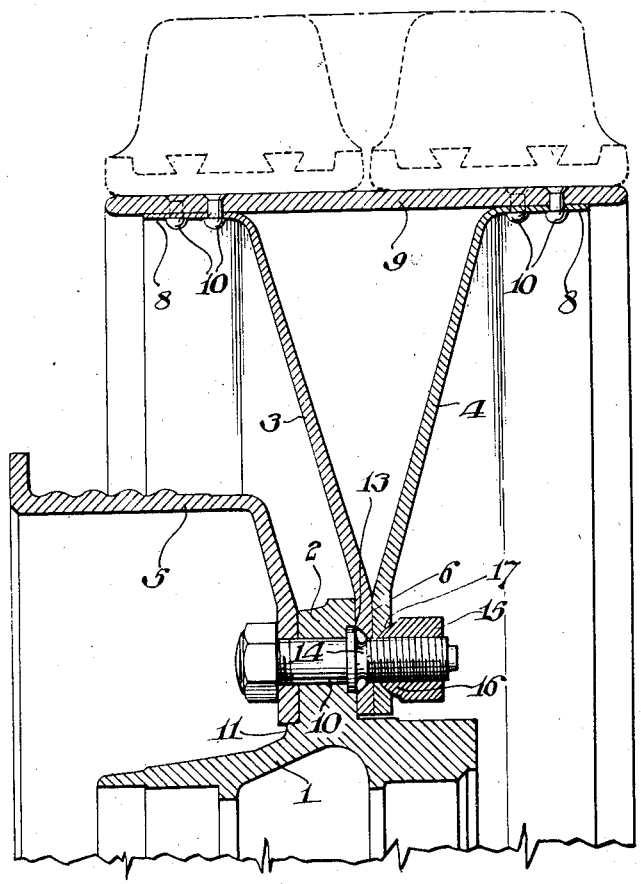
Fig. 1 is a fragmentary transverse sectional view of a wheel constructed in accordance with my invention.
Figure 2:
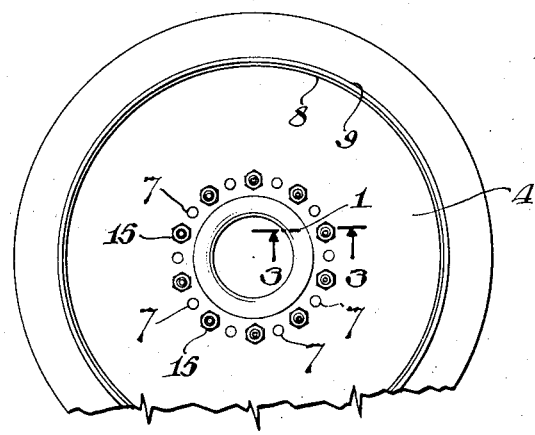
Fig. 2 is a side elevation thereof.

As shown particularly in Fig. 1, I employ a pair of disks 3 and 4 having their central portions 6 arranged in contacting relation and secured together by rivets 7 or welding or other suitable fastening means. From the central portion 6 the disks diverge, and adjacent their outer marginal edge portions, such disks are deflected over to define lateral seating portions 8 which receive a felly or rim 9 on which the tire may be directly or indirectly seated. The felly may be secured to seating portions 8 in any approved manner, as by means of rivets 10 which are preferably countersunk in the outer peripheral surface of the felly so that a tire or a combined tire and rim of any approved type may be seated thereon, as indicated by dotted lines in Fig. 1. It will be noted that each disk is identical in shape and size and is preferably of greatest thickness at its central portion 6 and tapers to a minimum at the outer seating portion 8.

A pair of disks fastened at their central portions and arranged as above described, and also brake drum 5, are fastened to the annular flange 2 by means of bolts 10. In this connection, it will be noted that the brake drum 5 is preferably seated on a shoulder 11 formed on the hub 1 and the inner peripheral edge of the disks 3 and 4 are spaced slightly from the hub so that the wheel is readily demountable at the hub although, in cases where demountability is not desired, the disks may be seated directly on the hub. The aforementioned bolts 10 extend through the brake drum, annular flange and disks to tie the assembly together, such bolts being preferably threaded at both ends and provided with a collar 13 seated within a countersink in the flange 2. A nut 14 is applied to the inner threaded end of each bolt to secure the brake drum in place. A nut 15 applied to the outer extremity of each bolt is formed with a tapered or conical portion 16 that is adapted to engage in a seat 17 in the disk 4, to center and secure the wheel body and felly assembly to the hub. It will be seen that the wheel is symmetrical as respects the central plane of its tread and can be readily assembled on the hub with either side outside.

In some instances wherein it is desired not to provide the wheel with a brake drum, it will be obvious that such drum may be omitted and the heads of bolts 10 will then engage directly with annular flange 2.

A wheel constructed as above described is especially durable against lateral and radial thrusts and torsional strains due to the divergent arrangement of the disks 3 and 4, and the manner in which the three parts, the two disks and the felly 9, are rigidly tied together so as to provide a box girder construction in cross-section. The felly 9 extending transversely between the seating portions 8 of the disks effectively seals the space therebetween against dirt and mud and, if desired, the felly may be of a width sufficient to accommodate a dual tire or a single tire. It is particularly adapted for the heavy duty service required of truck and buss wheels, where dual wheels are ordinarily employed.

What I claim is:—

1. A wheel of the character set forth comprising a hub member, a pair of disks secured to said hub member, said disks being disposed in divergent relation and free of each other from said hub to the outer peripheral portions thereof, and a cylindrical rim band rigidly connected commonly to the outer peripheral portions of each of said disks.

2. A wheel of the character set forth comprising a hub member, a pair of disks secured to said hub member, said disks being disposed in divergent relation throughout their areas from said hub to the outer peripheral portions thereof, the outer peripheral portion of each of said divergent disks being deflected laterally to define a seat, and a single tire supporting element commonly secured to said seats.

In testimony whereof he hereunto affixes his signature.

J. HAROLD HUNT.